(12) United States Patent
Baheri et al.

(10) Patent No.: US 11,659,002 B2
(45) Date of Patent: May 23, 2023

(54) EXTENDING MEDIA ACCESS CONTROL SECURITY (MACSEC) TO NETWORK-TO-NETWORK INTERFACES (NNIS)

(71) Applicant: Ciena Corporation, Hanover, MD (US)

(72) Inventors: Hossein Baheri, Monte Sereno, CA (US); Manoj Velliangiri, Santa Clara, CA (US); Pramod Kumar Aggarwal, Milpitas, CA (US)

(73) Assignee: Ciena Corporation, Hanover, MD (US)

( * ) Notice: Subject to any disclaimer, the term of this patent is extended or adjusted under 35 U.S.C. 154(b) by 242 days.

(21) Appl. No.: 17/307,075

(22) Filed: May 4, 2021

(65) Prior Publication Data
US 2022/0360605 A1 Nov. 10, 2022

(51) Int. Cl.
*H04L 9/40* (2022.01)
*H04L 45/24* (2022.01)
*H04L 9/08* (2006.01)
*H04L 41/0654* (2022.01)

(52) U.S. Cl.
CPC .......... *H04L 63/162* (2013.01); *H04L 9/0838* (2013.01); *H04L 41/0654* (2013.01); *H04L 45/24* (2013.01); *H04L 63/1408* (2013.01); *H04L 63/18* (2013.01)

(58) Field of Classification Search
CPC . H04L 63/162; H04L 9/0838; H04L 41/0654; H04L 45/24; H04L 63/1408; H04L 63/18
See application file for complete search history.

(56) References Cited

U.S. PATENT DOCUMENTS

| | | | |
|---|---|---|---|
| 10,164,873 B1 | 12/2018 | Sood et al. | |
| 11,115,389 B2* | 9/2021 | Gupta | H04L 63/04 |
| 2016/0036813 A1* | 2/2016 | Wakumoto | H04L 63/0272 713/171 |
| 2016/0043996 A1* | 2/2016 | Syed Mohamed | H04L 63/04 726/1 |
| 2017/0104851 A1* | 4/2017 | Arangasamy | H04L 63/0428 |

(Continued)

OTHER PUBLICATIONS

IEEE Computer Society, IEEE Standard for Local and metropolitan area networks, 802.1AE™, "Media Access Control (MAC) Security," Aug. 18, 2006, pp. 1-154.

*Primary Examiner* — Techane Gergiso
(74) *Attorney, Agent, or Firm* — Baratta Law PLLC; Lawrence A. Baratta, Jr.

(57) ABSTRACT

Systems and methods for enabling Media Access Control Security (MACsec) at a MAC layer, according to IEEE 802.1AE, and extending MACsec are provided. An edge device, according to one implementation, includes one or more User-to-Network Interface (UNI) ports and a plurality of Network-to-Network Interface (NNI) ports. The edge device also includes a processing device and a memory device configured to store a computer program having instructions. The instructions, when executed, allow the processing device to provide network security on a Media Access Control (MAC) layer, the network security defined by the MAC Security (MACsec) protocol. The instructions also allow the processing device to provide network path protection by enabling packet routing over multiple paths via the plurality of NNI ports on a network layer.

20 Claims, 4 Drawing Sheets

(56) References Cited

U.S. PATENT DOCUMENTS

| | | | |
|---|---|---|---|
| 2019/0116183 A1* | 4/2019 | Hussain | H04L 63/08 |
| 2020/0036570 A1 | 1/2020 | Curtis et al. | |
| 2020/0067891 A1* | 2/2020 | Singh | H04L 63/06 |
| 2020/0099568 A1 | 3/2020 | Baheri et al. | |

* cited by examiner

EXTENDING MEDIA ACCESS CONTROL SECURITY (MACSEC) TO NETWORK-TO-NETWORK INTERFACES (NNIS)

TECHNICAL FIELD

The present disclosure generally relates to networking systems and methods. More particularly, the present disclosure relates to extending Media Access Control Security (MACsec) to a network layer where path protection is provided.

BACKGROUND

Generally, Media Access Control (MAC) addresses are used for identifying physical devices in a network. MAC Security (MACsec) is a network security standard defined by IEEE 802.1AE that operates on the data link layer (Layer 2) comprising a MAC sub-layer and a Logical Link Control (LLC) sub-layer. MACsec is configured to define data confidentiality and integrity for media access independent protocols for devices attached within the same Local Area Network (LAN).

A MACsec frame includes, among other things, a security tag, which is an extension of EtherType. For example, EtherType can be used for Virtual LAN (VLAN) tagging defined in IEEE 802.1Q and may be used to identify the size of the frame and protocol of the frame. The security tag includes an association number and a packet number, whereby the packet number can be used to protect a network against a "replay attack." For example, a replay attack (also known as a "playback attack") is a network attack in which valid data transmissions are intercepted by a malicious device and repeated at a later time to fool other devices into believing that the malicious device is legitimate. Therefore, a source node may provide data packets that egress from a port with a certain packet number and a downstream destination node may receive the data packets at an ingress port with the packet number lower than the originating number. By comparing these packet numbers, it is possible to reduce replay attacks in a network.

It should be noted that conventional systems using MACsec typically perform the MACsec network security functions on a LAN where one or more user devices are connected via User-to-Network Interfaces (UNIs) to a Provider Edge (PE), switch, router, node, etc., which in turn provides service or network access to the user devices via one or more other networks (e.g., the Internet). Often, the PE devices are configured in a network where multiple paths are possible, whereby redundancy can be provided. For example, a primary path may be established through a network and one or more protection (or alternative) paths may also be established as backup paths if the primary path is unavailable or faulty. However, the MACsec standard is not designed for operation on the network layer where protection paths are available. More particularly, network technologies performed at the PE devices for redundancy are traditionally not equipped for MACsec functionality. Also, traffic moving from a user level to a network level must first be encrypted before forwarding to the PE devices having network interfaces with network path protection capabilities. However, in conventional systems, this traffic can only be encrypted by additional devices, resulting in additional operational and equipment costs.

Therefore, there is a need to extend MACsec to allow this network security in a network layer where interfaces are configured to provide network path protection for enabling routing through alternate paths if a fault is detected on a primary path and allowing MACsec. Also, there is a need to enable MACsec in a network environment while reducing the detection of replay attacks that might otherwise be detected when there is a mismatch in packet numbers.

BRIEF SUMMARY

The present disclosure is directed to systems, methods, non-transitory computer-readable media, and edge devices within a network. The various embodiments allow operation of MAC Security (MACsec) processes, which may originate at a User-to-Network Interface UNI for enabling network security over a portion of a network. Along this portion of the network, the embodiments may also include enabling path protection processes over Network-to-Network Interfaces (NNIs). Thus, based on the various implementations of the present disclosure, simultaneous MACsec and path protection processes may operate over NNI ports and links of a network.

An edge device, according to one embodiment, includes one or more UNI ports and a plurality of Network-to-Network Interface (NNI) ports. The edge device may also include a processing device and a memory device configured to store a computer program having instructions that, when executed, allow the processing device to perform certain functions. For example, the processor may be allowed to provide network security on a Media Access Control (MAC) layer, where the network security may be defined by the MACsec protocol. Furthermore, the processor may be allowed to provide network path protection by enabling packet routing over multiple paths via the plurality of NNI ports on a network layer. For example, in some embodiments, the instructions may further allow the processing device to extend MACsec into Layer 3 operation.

According to additional embodiments, the instructions of the computer program of the edge device may further allow the processing device to match a packet number egressing each NNI port with a highest packet number egressing the plurality of NNI ports. Matching the packet number with the highest packet number may be configured to reduce packet drops when a replay attack process detects differences in packet numbers over the multiple paths. The instructions can further allow the processing device to utilize a MACsec Key Agreement (MKA) protocol data unit identified by one or more of a unicast MAC address and a multicast MAC address.

The NNI ports may be configured for operation in an Ethernet Ring Protection Switching (ERPS) network defined by G.8032, and wherein a MAC flush action according to G.8032 is configured to trigger the action of matching the packet number with the highest packet number by reading the packet numbers egressing each NNI port and configuring NNI port on the egress device in the ERPS with the highest packet number. This includes relying on writing the highest packet number into the new active port/flow egressing the device. In addition, MKA will update the expected packet number. The NNI ports may alternatively be configured for operation in a packet-switching network selected from the group consisting of a Multi-Protocol Label Switching (MPLS) network, a Segment Routing (SR) network, G.8032, and a Spanning Tree Protocol (STP) network. In this case, the instructions may also allow the processing device to match the packet numbers for a primary path and one or more protection paths by synchronizing the packet number of a selected protection path of the one or more protection paths at switchover to the primary path.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

The present disclosure relates to systems and methods for extending Media Access Control Security (MACsec) to beyond normal operation on a Local Area Network (LAN). For example, the present systems and methods allow MACsec to operate in a network layer (e.g., Layer 3) where path protection may be available. For example, path protection refers to a network having multiple paths or routes that data packets can follow from a source node to a destination node. Some examples of networks with path protection include arrangement of network elements in a ring topology, Ethernet Ring Protection Switching (ERPS) topology defined by G.8032, Multi-Protocol Label Switching (MPLS) topology, Segment Routing (SR) topology, Spanning Tree Protocol (STP) topology, and the like.

The IEEE 802.1AE standard defines MACsec as a network security protocol for securely transmitting data packets in a Media Access Control (MAC) layer (e.g., Layer 2). MACsec defines connectionless data confidentiality and integrity for devices of a LAN or Virtual LAN (VLAN) accessing a wide area or public network and may be independent of certain networking protocols.

According to various embodiments of the present disclosure, edge devices (e.g., Provider Edge (PE) devices, routers, switches, etc.) may be configured to operate at an edge, interface, or demarcation point between a network layer environment and a user (e.g., LAN) environment. In operation, the edge devices may be configured to provide network path protection to enable one or more backup or alternative paths to be used when a primary path is unavailable or includes a fault. In addition to network path protection, the edge devices (unlike conventional systems) are also able to perform network security (i.e., MACsec in accordance with IEEE 802.1AE). Thus, these edge devices may be configured to perform MACsec on Network-to-Network Interfaces (NNIs) while also providing path protection within a network topology having any suitable type of primary and backup paths (e.g., an ERPS ring topology in accordance with G.8032, Segment Routing (SR), dynamic MPLS, xSTP, etc.).

MACsec Frame

Figure 1A:
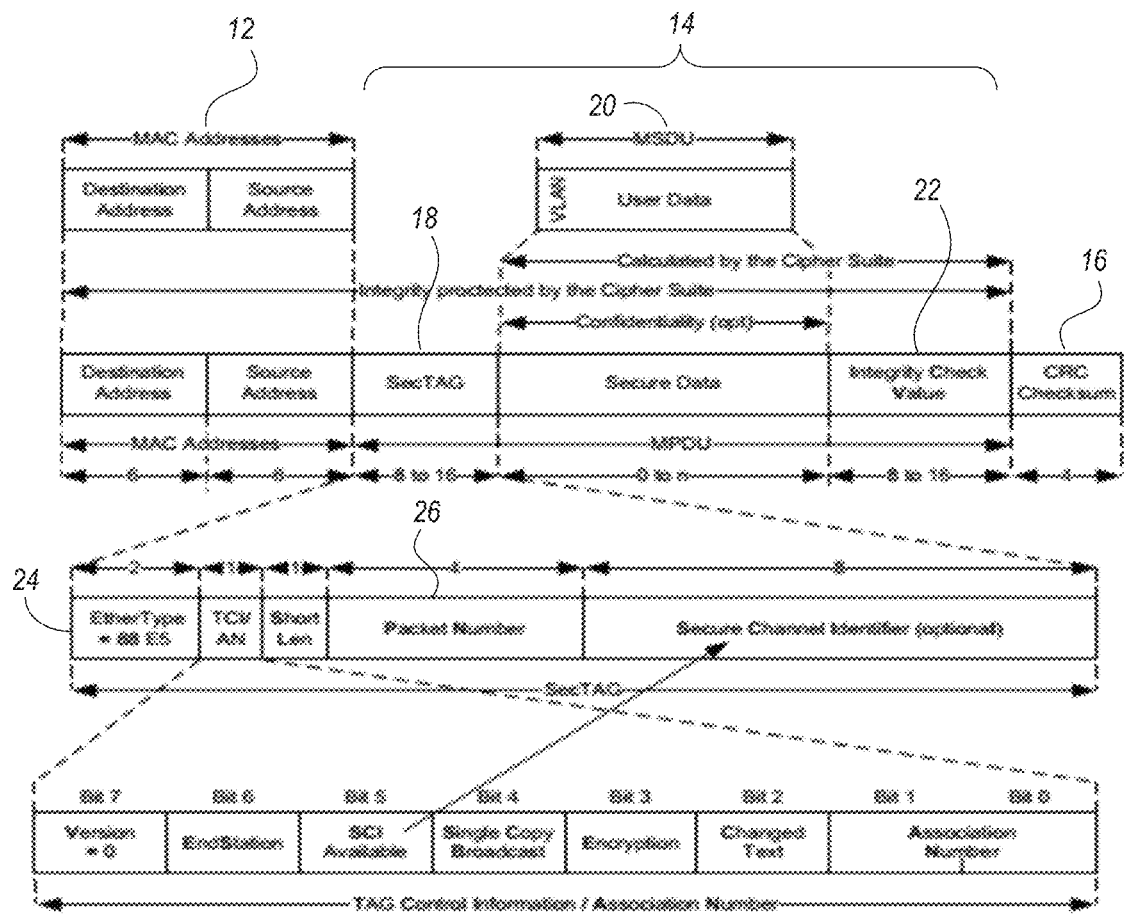
FIGS. 1A and 1B are diagrams illustrating MACsec frames, according to some embodiments of the present disclosure.

FIG. 1A is a diagram illustrating an embodiment of a MACsec frame 10 that may be used in the various implementations of the present disclosure. In this embodiment, the MACsec frame 10 includes MAC addresses 12 (i.e., destination addresses and source addresses), a MAC Protocol Data Unit (MPDU) 14, and a Cyclic Redundancy Check (CRC) checksum 16. The MPDU 14 may include protocol information that can be used to identify what type of packet is being transferred (e.g., email, a web page, video, etc.). The MPDU 14 includes a security tag (SecTAG) 18, a MAC Service Data Unit (MSDU) 20, and an integrity check value 22. The SecTAG 18 includes, among other things, an EtherType field 24 and a packet number 26. Referring to the packet number field 26 of the MACsec frame 10, the packet number may include a first number for indicating how many packets are included in a data stream and a second number for indicating where the packets are included within the data stream.

Figure 1B:
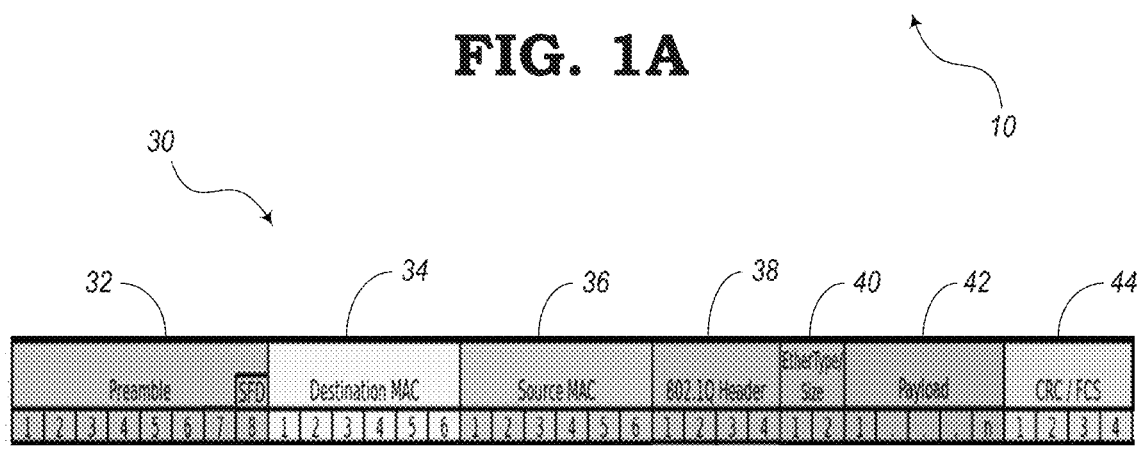

FIG. 1B is a diagram illustrating an embodiment of a MACsec frame 30 including a preamble 32, a destination MAC field 34, a source MAC field 36, an 802.1Q header 38 (optional), an EtherType field 40, payload 42, and a CRC and Frame Check Sequence (FCS) field 44. These and other various frame formats may be used for communicating MACsec information according to the various implementations of the present disclosure.

It may be noted that the MACsec frames 10, 30 may include a frame format that is similar to an Ethernet frame, but may also include additional fields. For example, the security tag (SecTAG) field 18 (or 802.1Q header field 38) may be referred to in some cases as an extension of the EtherType field 24, 40 and may be configured in some embodiments to authenticate messages. The SecTAG 18 in each MACsec frame 10 may include, among other things, the packet number field 26, which may provide, among other things, protection against "replay attacks."

MACsec is configured to specify a set of protocols that meet certain security requirements for securely protecting data traversing Ethernet LANs. Also, MACsec is configured to identify unauthorized LAN connections to exclude these connections from communication within the network. In addition, MACsec is configured to provide data confidentiality, data integrity, and data source authentication.

The embodiments of the present disclosure may be configured to utilize the EtherType field 24, 40 for performing certain functions described herein. In particular, the EtherType field 24, 40 is configured to indicate which protocol is encapsulated in the payload of the frame and is used at the receiving end by the data link layer to determine how the payload is processed. The EtherType field 24, 40 may also be configured to indicate the size of some Ethernet frames. In some embodiments, the EtherType field 24, 40 may be used in an 802.1Q VLAN tagging process and may be configured to encapsulate packets from VLANs for transmission with other VLAN traffic over an Ethernet link.

The packet number 26 of the SecTAG field 18 may be configured to include information that can be used to detect a "replay attack" in a network. For example, a replay attack (or playback attack) is a type of attack where a valid data transmission is intercepted and fraudulently repeated, such as in a spoofing-type attack. The replay attack can also be defined as an attack on a security protocol using a replay of messages from a different context into an originally intended context to deceive other devices in the network to believe that an operation has been successfully completed.

G.8032 Ethernet Ring Protection Switching

Figure 2:
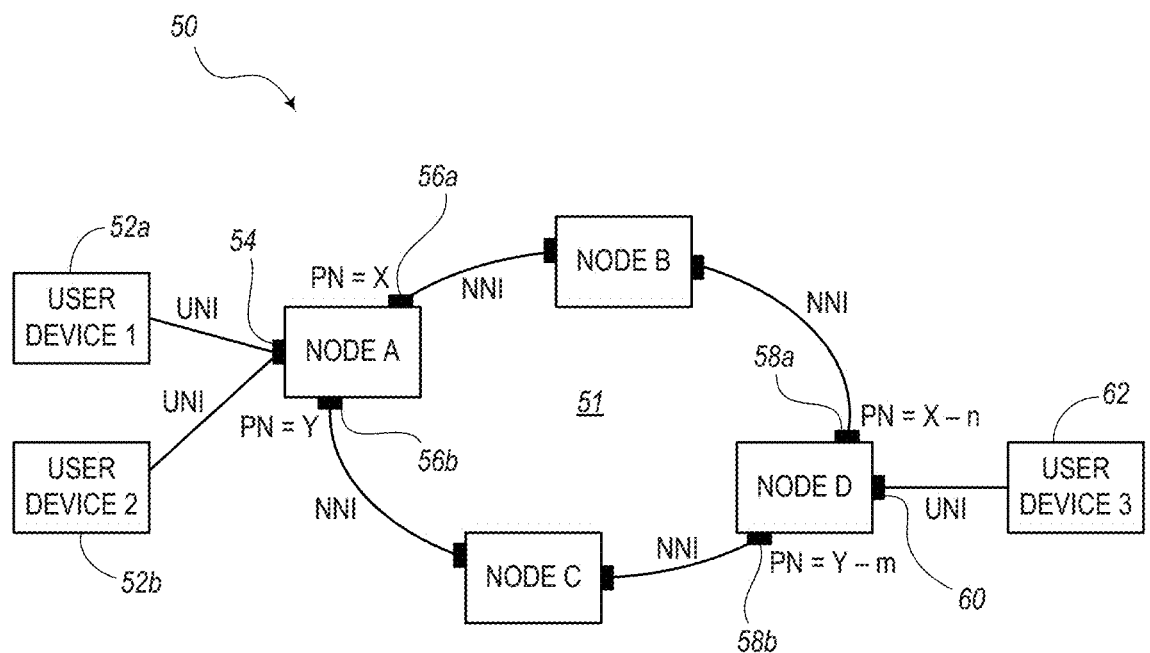
FIG. 2 is a schematic diagram illustrating user devices connected to a network having an Ethernet Ring Protection Switching (ERPS) arrangement in which Media Access Control Security (MACsec) and path protection are both enabled in the ERPS, according to some embodiments of the present disclosure.

FIG. 2 is a schematic diagram illustrating an embodiment of a network 50 having an Ethernet Ring Protection Switching (ERPS) arrangement 51 in accordance with G.8032. For example, the ERPS arrangement 51 includes Node A, Node B, Node C, and Node D organized in a ring topology. As described in more detailed below, the embodiment of the network 50 may be operated to enable Media Access Control Security (MACsec) network security measures in addition to path protection, both of which can be enabled in the Network-to-Network Interfaces (NNIs) of the ERPS.

One or more user devices may be connected to a source edge device (i.e., Node A). As shown in FIG. 2, a first user device 52a and a second user device 52b are connected to a User-to-Network Interface (UNI) port 54 of Node A along UNIs. The user devices 52a, 52b, and other devices may be configured within a Local Area Network (LAN) or Virtual LAN (VLAN) connected by UNIs.

In addition to the UNI port 54 for connection with user devices 52a, 52b, Node A further includes two NNI ports 56a, 56b for connection to Node B and Node C, respectively, via two NNIs. In this example, data packets egressing from Node A through the NNI port 56a include a Packet Number (PN) having a value of X (i.e., PN=X). The PN may correspond to a value stored in the packet number field 26 shown in FIG. 1A. Similarly, data packets egressing from Node A through the NNI port 56b include a PN having a value of Y (i.e., PN=Y), which may also be stored in the packet number field 26 of this data frame.

The source edge device's (i.e., Node A) packet number will be more than Node D as it take time (T) for packets to arrive at destination. In this example, the Packet Number (PN) reaching a first NNI port 58a of Node D may be X minus n (i.e., PN=X−n), where n is the number of packets along the path from Node A to Node B to Node D. Similarly, the number of packets reaching the destination edge device (i.e., Node D) will be less than the original packet number (i.e., Y) for this second set of packets. In this example, the PN reaching a second NNI port 58b of Node D may be Y minus m (i.e., PN=Y−m), where m is the number of queued packets along the path from Node A to Node C to Node D. Therefore, there are two different routes or paths along which data packets may be transmitted from the source Node A to the destination Node D.

As an edge device, Node D is also configured to operate between a network environment (NNI) and a user environment (UNI). Node D includes a UNI port 60 configured to transmit the data packets along a UNI to a third user device 62 (MACSec capable device). The third user device 62 and other devices may be arranged within a LAN or VLAN and communicate over UNI links. It should be noted that there may be one or more user devices connected to the UNI port 54 of Node A along one or more UNI links and one or more user devices connected to the UNI port 60 of Node D along one or more UNI links, depending on various possible network configurations.

MPLS, SR, STP Network Configuration

Figure 3:
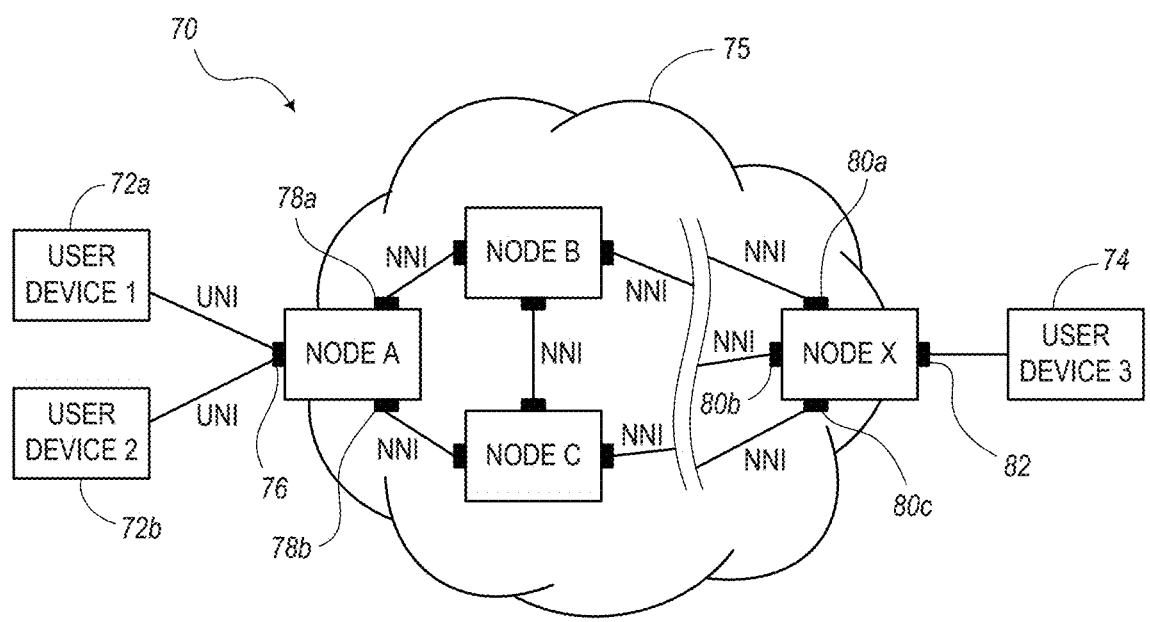
FIG. 3 is a schematic diagram illustrating user devices connected to a network having a Multi-Protocol Label Switching (MPLS) arrangement in which MACsec and path protection are both enabled in the MPLS, according to some embodiments of the present disclosure.

FIG. 3 is a schematic diagram illustrating an embodiment of a network 70 having a Multi-Protocol Label Switching (MPLS), Segment Routing (SR), or Spanning Tree Protocol (STP) arrangement or other suitable arrangement where data packets may be routed along at least two different paths. In this embodiment, a source edge device (i.e., Node A) is configured for connection with one or more user devices and a destination edge device (i.e., Node X) is also configured for connection with one or more user devices. As shown, Node A is connected to two user devices (i.e., a first user device 72a and a second user device 72b) and Node X is connected to one or more user devices (i.e., a third user device 74). A first set of user devices (e.g., user devices 72a, 74b and other devices within a specific group) may be arranged in a LAN or VLAN. A second set of user devices (e.g., user devices 74 and other devices within a specific group) may also be arranged in another LAN or VLAN.

In the arrangement of FIG. 3, MACsec may be configured to operate in a multi-path section 75 of the network 70 where path protection is also available over MPLS, SR, STP, etc. The user devices 72a, 72b are connected to a UNI port 76 of Node A. Node A also include any number of NNI ports, depending on the topology of the multi-path section 75 of the network 70. As shown, Node A includes two NNI ports 78a, 78b for connection with Node B and Node C, respectively. In other embodiments, Node A may include additional NNI ports for connection to additional nodes within the multi-path section 75. In addition to NNI ports connected to NNI ports 78a, 78b of Node A, the nodes labelled Node B and Node C may also include one or more additional NNI ports to one or more other nodes (or to each other).

Other intermediate nodes (e.g., between Node B and Node X and/or between Node C and Node X), if any, are not shown in FIG. 3. Depending on various MPLS configurations, Node X may be connected to a plurality of nodes (e.g., Node B, Node C, and/or other intermediate nodes) via a plurality of NNI ports 80a, 80b, 80c, etc. As will be understood, there may any number of different paths through the multi-path section 75 for creating a primary path where a preferred route may exist in addition to one or more additional alternative or protection paths that can be used as a backup if the primary path is down.

With the topology of network 50, network 70, or other suitable network where at least two alternative paths are available, the systems and methods of the present disclosure are configured to provide path protection throughout the respective network while also allowing MACsec to continue providing network security throughout the network as well. Conventional systems are unable to provide MACsec on Network-to-Network Interfaces (NNIs) of networks having path protection.

In some embodiments, MACsec traffic may provide network security in an end-to-end manner from the user devices 52 at one end to the user devices 62 at the other end in the embodiment of FIG. 2 or from the user devices 72 at one end to the user devices 74 at the other end in the embodiment of FIG. 3. Also, according to the embodiments of the present disclosure, the path protection in the NNIs of the networks is configured so as not to terminate MACsec at the edge devices (e.g., Node A) as would typically be the case with conventional systems. Thus, the present embodiments are configured to reduce the number of traffic drops that may be cause by using path protection techniques provided by network technology.

In the end-to-end solution, data packets for specific flows (e.g., VLAN, MPLS, etc.) are encrypted at MACsec-capable devices and forwarded through a network which may not typically be capable of continuing MACsec. This may be achieved by having VLAN or MPLS labels with the data packets. Also, the data packets may also be transmitted with additional information or labels, such as Customer tags (C-tags), Security tags (S-tags), a number (N) of bytes, etc. while sending data over MACsec-capable links.

Referring back to the G.8032 Ethernet Ring configuration of FIG. 2, NNI path protection can be configured to allow MACsec to continue through the network 50. In this embodiment, the user devices 52, and Nodes B and C may be configured as devices that are not necessarily MACsec-capable. However, in this case, Node A (i.e., the edge devices for interfacing between UNI and NNI) and User Device 3 are configured as MACsec-capable devices. In some embodiments, a user (e.g., network manager) may be allowed to configure a set of flows to be encrypted/decrypted when egressing/ingressing Node A and Node D, according to at least one of the techniques described below.

Technique Utilizing MKA

In this technique, a first step may include replicating configurations of each flow on both edge devices (i.e., Node A (or Node X) at the other end). The configurations may be replicated at the time when the devices are initially deployed (e.g., in the G.8032 ring). In the case of Segment Routing (SR), the configurations may be replicated when a protection path is identified and programmed by the routing protocol. In the case of MPLS, the configurations may be replicated when a new path is identified.

A second step in this technique includes utilizing a field known as a MACsec Key Agreement (MKA), which may be part of the SecTAG 18 or EtherType 24, 40 shown in FIGS. 1A and 1B. The MKA may be part of a security protocol and may be configured to run on configured flows (e.g., VLAN, MPLS, etc.) between the two edge devices Node A and User Device3/Node X. G.8032 and SR are configured to protect traffic and MKA Protocol Data Units (PDUs) in the network.

A third step include identifying the MKA PDUs by a multicast MAC address or a unicast MAC address of the MACsec-capable devices (i.e., Nodes A and User Device3). In some embodiments, this may include a user-configurable EtherType (e.g., EtherType 24, 40), which can be used if any intermediate devices (e.g., Node B, Node C, and other intermediated nodes) do not terminate or absorb the PDUs.

A fourth step includes utilizing the Packet Numbers (PNs) (e.g., packet number 26) at each of Nodes A and D. For example, Nodes A and D may each include a component (e.g., a MACsec chip) that can utilize the PN in order to protect against replay attack. With MACsec-encrypted data traffic, if the packet number 26 of the SecTAG 18 received at the destination node (e.g., User Device3, Node X) is lower than a configured replay window, the packet will be discarded by the destination node. As shown in FIG. 2, the packet numbers on the egress of Node A will always be greater or equal to the ingress side of node D (unless there is misbehavior in the network). A convergence in the ring (e.g., at destination edge device or Node D) may be configured, according to the various embodiments of the present disclosure, to allow the traffic to be routed on different paths with no issues, since, in this case, the edge devices may be configured to match the packet numbers between the source and destination.

A fifth step in this technique may include allowing the MKA protocol to continue to run. In some embodiments, the MKA protocol may be configured on the path protected VLAN (S-tag).

Technique Utilizing Packet Numbers

In this technique, the source and destination edge devices (e.g., Node A or X) may be configured to match or synchronize the packet numbers on both (or all) paths. For example, this technique may be performed in a case where the source edge device (e.g., Node A) is MACsec-capable and a user device outside the NNI network (e.g., ERPS arrangement 51, multi-path section 75, etc.) is also MACsec-capable.

In this case, the packet numbers received on the edge device Node D (or Node X) may be X-n and Y-m at a particular time (T). Assuming, for example, that user device 62 (or 74) receives packets from a first (west) interface (e.g., via NNI port 58a of Node D or via NNI port 80a of Node X) and this packet number PN has a value of X-n (e.g., 1000000). Also, because of a convergence (i.e., alternate path) in the network, the user device 62, 74 may also receive packets from another (east) interface (e.g., via NNI port 58b of Node D or via NNI port 80c of Node X) and this packet number PN has a value of Y-m, which, in this case, may be significantly lower than the previous PN received in first (west) interface 58a, 80a. According to conventional system, detection of a replay attack may result in dropping the packet drop at the user device 62, 74 since replay protection will kick in. For example, a default window (e.g., defined by a threshold to which the values "n" or "m" may be compared) may be very low (e.g., about 60). In order to prevent the reaction to a change in packet number that might cause the dropping of a packet when it appears as if a replay attack has occurred, the following steps may be executed.

The packet numbers PN egressing the transmitting or source edge device (e.g., Node A) at the two (or more) NNI ports 56, 78 may be altered before being transmitted with the data packet. According to the embodiments of the present disclosure, Node A is configured to compare the PNs from each of its NNI ports 56, 78 and detects which PN is the highest. Then, Node A is configured to reset the PNs on each NNI port and replace it with this highest number.

As a result of replacing the lower PNs with the highest PN, the networks 50, 70 are configured to provide the following effects. The receiver nodes (e.g., User Device3, Node X) will receive a bigger packet number rather than a smaller one. Also, User Device3 and X will get a bigger packet number than one reported by the MKA as a Lowest Acceptable Packet Number (LAPN).

In G.8032 embodiments (e.g., network 50 of FIG. 2), the network 50 may be configured to rely on "flush" triggers when network convergence occurs, where convergence may be based on flush, flood, and learn processes. In this case, the PNs are matched or synced at flush time to reduce packet drops triggered by the replay window (i.e., associated with replay attack detection) at the receiver Nodes User Device3, X. At the flush time, the PNs at both (or all) NNI ports 56, 78 can be read. Then, Node A is configured to flush the lower PN values and replace them with the greater PN value at the NNI ports 56, 78. With this approach, the packet loss may only depend on the G.8032 convergence performance.

In MPLS, SR, STP embodiments, or the like where there is an awareness of protection switch actions (e.g., triggered by Bidirectional Forwarding Detection (BFD) or other methods) and primary/backup paths, the action of matching/syncing PNs can occur at a time of switchover from a primary path to the backup path. In this case, the configuration and PN can be written to a protection (backup) path if it is different than the highest one. Again, this strategy may reduce the number of dropped packets caused by the switchover and allows MACsec to continue from end-to-end.

In some embodiments, a periodic match/replace/synchronization process may be followed. The periodic replacement of lower PNs with the highest PN may be performed if a) the packet numbers PN cannot be retrieved at a time of network convergence or primary path failure (e.g., caused by a line card or other hardware failure) and b) a protection function is performed in the network with no upward notification capabilities (e.g., hardware-based switchover). In this technique, the Transmitter (Tx) packet numbers PNs on the egress NNI ports 56, 78 (e.g., interfaces) are pulled (retracted) and the larger number instead is written back to the egress NNI ports 56, 78 (e.g., interfaces) with lesser values. The frequency (or time period) of the sync process may impact the number of packet drops triggered by replay window protection. For example, a sync frequency of 10 ms may result in 10 ms packet drops if a replay window is 0. A default window may be set to about 60 packets, as packets may be on transit in intermediate nodes between the source and destination edge device.

According to one example of the systems and methods described in the present disclosure, the packet numbers PN at various egress NNI ports and ingress NNI ports may be detected along various different packet routing paths in the networks 50, 70. In this example, the PNs for the different paths may be detected before convergence, after convergence (when PNs are not synced), and after convergence (when PNs are synced). For example, before convergence, Node A may include a PN at NNI port 56*a*, 78*a* (along a first path P1) of 100001 (i.e., PN=100001). At Node D/X (and received by user device 62, 74), the PN at ingress NNI port 58*a*, 80*a* along this first path P1 may represent a LAPN of 100000. Along a second path P2, the PN egressing NNI port 56*b*, 78*b* of the Tx (i.e., Node A) may be 100 (i.e., PN=100 at NNI port 56*b*, 78*b*). As may be understood, without the techniques described in the present disclosure, packets along this second path P2 will be dropped in most cases.

In this same example, a condition of the network 50, 70 may also be detected after convergence in the situation where PNs are not synched (e.g., according to conventional systems). In this case, the PN at the NNI port 56*a*, 78*a* of Node A along the first path P1 may be 100001 and the LAPN at the ingress NNI port 58*a*, 80*a* may be 100000. Along the second path P2, the PN at the egress NNI port 56*b*, 78*b* of the Tx (i.e., Node A) may be 101 and the PN received at ingress NNI port 58*b*, 80*c* of Node D or X may be 101, and thus the packet will be dropped since the PN at the Receiver (Rx) (e.g., User Device3 or Node X) will be less than the LAPN of 100000. For G.8032, the user node should be MAsSec capable and the user node will compare the packet numbers.

However, according to the techniques described in the systems and methods of the present disclosure, MACsec may continue through the NNI portion of the path-protection-enabled networks 50, 70. For example, the simultaneous provision of MACsec and path protection may be enabled after convergence if the PNs of both (or all) egress NNI ports are replaced with the highest PN (e.g., PN matched, synched, etc.). In this case, the egress NNI port 56*a*, 78*a* of Tx Node A on the first (primary) path may provide a PN of 100001. At the ingress NNI port 58*a*, 80*a* of Rx Node D/X on the first path may include a different PN to be compared with a LAPN (e.g., 100000). It may be assumed in this example that the PN at Node User-Device3/X is within the LAPN window for preventing a dropped packet caused by replay attack detection. Furthermore, along a second path P2, the PN at the egress NNI port 56*b*, 78*b* of Tx may be 100001 and the PN at the ingress NNI ports 58*b*, 80*c* of Rx may also be 100001, whereby the packet will be accepted since the received PN would be greater than the LAPN.

Some additional aspects of the simultaneous MACsec network security functionality and path protection functionality are described here. The MACsec and path protection functions may be supported on the same device, such as a source edge device (e.g., Node A or other Tx devices). In the present embodiments, the source edge device may be configured with NNI ports for communicating along NNI links to other nodes within a network. Also, the MACsec traffic may be configured to continue unhindered despite the network path protection with the network topology of redundant paths to thereby provide end-to-end network security with minimum packet drops during path switching (e.g., switchover) from one path (e.g., primary path) to another (e.g., secondary, alternative, backup path) when a path failure is detected or when a network is deployed with network convergence capabilities.

Additional aspects may also include MKA PDUs that may be identified by multicast MAC addresses or unicast MAC addresses of MACsec-capable devices (e.g., Nodes A, User Device3, and X) and possibly user-configurable EtherType fields. For example, EtherType can be used if intermediate devices do not terminate or absorb the PDUs.

Also, as described in the present disclosure regarding the various embodiments, the packet numbers PNs between working and protection paths may be synced to reduce packet discard during protection switching. Furthermore, the techniques of the present disclosure may work with different network technologies, including, for example, G.8032 Ethernet ring, xSTP, SR, MPLS, and other network technologies with protection topology. It is possible that path protection and simultaneous MACsec functionality may operate with existing MACsec devices and networks, whereby no new hardware and no new MKA protocol changes would be needed.

Edge Device

Figure 4:
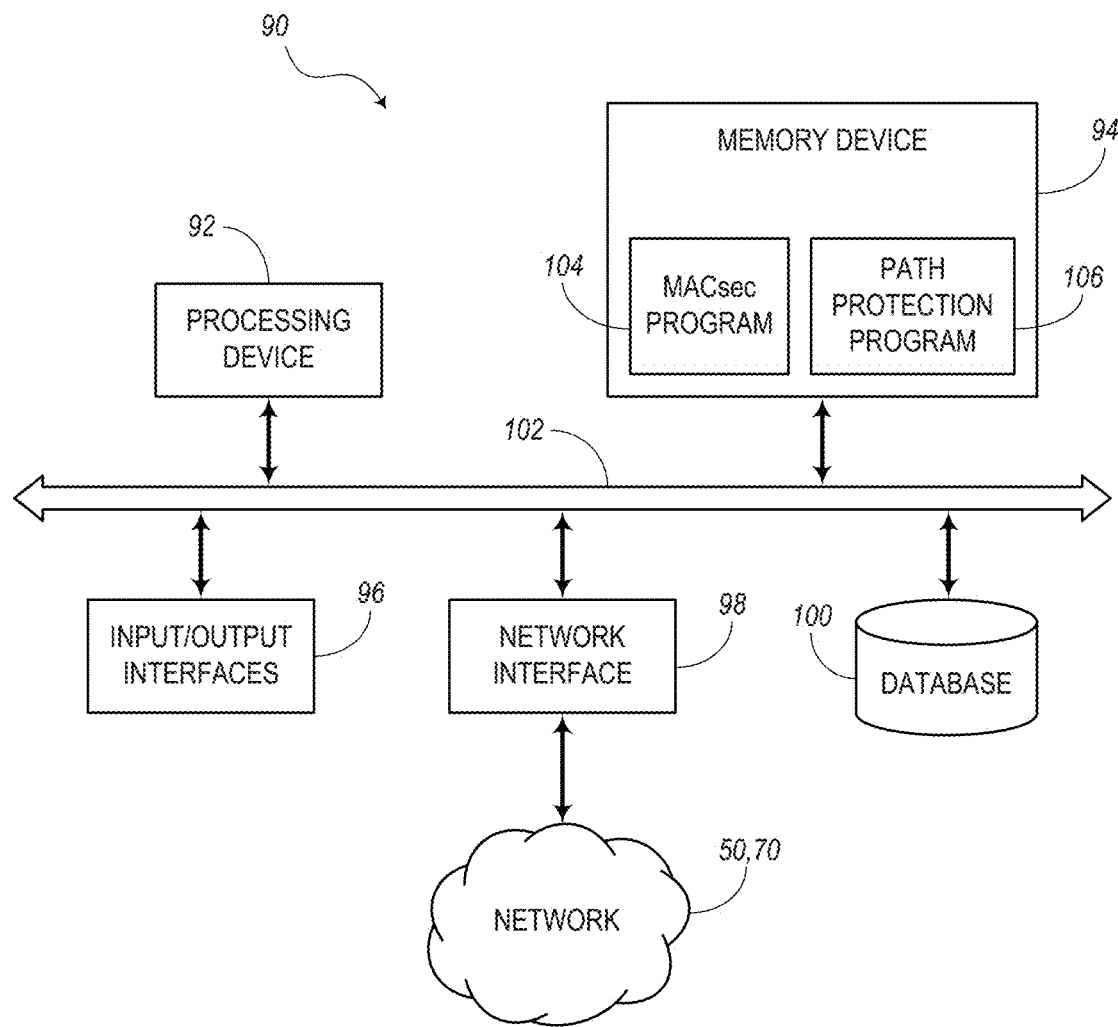
FIG. 4 is a block diagram illustrating an edge device having control functionality for enabling both MACsec and path protection on a network layer, according to some embodiments.

FIG. 4 is a block diagram illustrating an embodiment of an edge device 90 having control functionality for enabling both MACsec and path protection on a network (or NNI) layer. For example, the edge device 90 of FIG. 4 may be a Tx node, source edge device, etc., such as Node A shown in FIGS. 2 and 3. In other embodiments, the edge device 90 may be a Rx node, destination edge device, etc., such as User Device3 shown in FIG. 2 or Node X shown in FIG. 3. The edge device 90 may be configured for operation in a network (e.g., network 50, 70).

In the illustrated embodiment, the edge device 90 may be a digital computer that, in terms of hardware architecture, generally includes a processing device 92, a memory device 94, Input/Output (I/O) interfaces 96, a network interface 98, and a database 100. The memory device 94 may include a data store, database (e.g., database 100), or the like. It should be appreciated by those of ordinary skill in the art that FIG. 4 depicts the edge device 90 in a simplified manner, where practical embodiments may include additional components and suitably configured processing logic to support known or conventional operating features that are not described in detail herein. The components (i.e., 92, 94, 96, 98, 100) are communicatively coupled via a local interface 102. The local interface 102 may be, for example, but not limited to, one or more buses or other wired or wireless connections. The local interface 102 may have additional elements, which are omitted for simplicity, such as controllers, buffers, caches, drivers, repeaters, receivers, among other elements, to enable communications. Further, the local interface 102 may include address, control, and/or data connections to enable appropriate communications among the components 92, 94, 96, 98, 100.

The processing device 92 is a hardware device adapted for at least executing software instructions. The processing device 92 may be any custom made or commercially available processor, a Central Processing Unit (CPU), an auxiliary processor among several processors associated with the edge device 90, a semiconductor-based microprocessor (in the form of a microchip or chip set), or generally any device for executing software instructions. When the edge device 90 is in operation, the processing device 92 may be configured to execute software stored within the memory device 94, to communicate data to and from the memory device 94, and to generally control operations of the edge device 90 pursuant to the software instructions.

It will be appreciated that some embodiments of the processing device 92 described herein may include one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), and the like). The processing device 92 may also include unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry" or "logic" that is "configured to" or "adapted to" perform a set of operations, steps, methods, processes, algorithms, functions, techniques, etc., on digital and/or analog signals as described herein for the various embodiments.

The I/O interfaces 96 may be used to receive user input from and/or for providing system output to one or more devices or components. User input may be provided via, for example, a keyboard, touchpad, a mouse, and/or other input receiving devices. The system output may be provided via a display device, monitor, Graphical User Interface (GUI), a printer, and/or other user output devices. I/O interfaces 96 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an Infra-Red (IR) interface, a Radio Frequency (RF) interface, and a Universal Serial Bus (USB) interface.

The network interface 98 may be used to enable the edge device 90 to communicate over a network, such as the network 50, 70, the Internet, a Wide Area Network (WAN), a Local Area Network (LAN), and the like. The network interface 98 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The network interface 98 may include address, control, and/or data connections to enable appropriate communications on the network 50, 70.

The memory device 94 may include volatile memory elements (e.g., Random Access Memory (RAM)), such as Dynamic RAM (DRAM), Synchronous DRAM (SDRAM), Static RAM (SRAM), and the like, nonvolatile memory elements (e.g., Read Only Memory (ROM), hard drive, tape, Compact Disc ROM (CD-ROM), and the like), and combinations thereof. Moreover, the memory device 94 may incorporate electronic, magnetic, optical, and/or other types of storage media. The memory device 94 may have a distributed architecture, where various components are situated remotely from one another, but can be accessed by the processing device 92. The software in memory device 94 may include one or more software programs, each of which may include an ordered listing of executable instructions for implementing logical functions. The software in the memory device 94 may also include a suitable Operating System (O/S) and one or more computer programs. The O/S essentially controls the execution of other computer programs, and provides scheduling, input-output control, file and data management, memory management, and communication control and related services. The computer programs may be configured to implement the various processes, algorithms, methods, techniques, etc. described herein.

The memory device 94 may include a data store used to store data. In one example, the data store may be located internal to the edge device 90 and may include, for example, an internal hard drive connected to the local interface 102 in the edge device 90. Additionally, in another embodiment, the data store may be located external to the edge device 90 and may include, for example, an external hard drive connected to the Input/Output (I/O) interfaces 96 (e.g., SCSI or USB connection). In a further embodiment, the data store may be connected to the edge device 90 through a network and may include, for example, a network attached file server.

Moreover, some embodiments may include a non-transitory computer-readable storage medium having computer readable code stored in the memory device 94 for programming the edge device 90 or other processor-equipped computer, server, appliance, device, circuit, etc., to perform functions as described herein. Examples of such non-transitory computer-readable storage mediums include, but are not limited to, a hard disk, an optical storage device, a magnetic storage device, a Read Only Memory (ROM), a Programmable ROM (PROM), an Erasable PROM (EPROM), and Electrically Erasable PROM (EEPROM), Flash memory, and the like. When stored in the non-transitory computer-readable medium, software can include instructions executable by the processing device 92 that, in response to such execution, cause the processing device 92 to perform a set of operations, steps, methods, processes, algorithms, functions, techniques, etc. as described herein for the various embodiments.

According to some embodiments of the present disclosure, the edge device 90 may include programs for performing the techniques and functionality described herein. For example, the edge device 90 may include a MACsec program 104 and a path protection program 106. In some embodiments, the MACsec program 104 may be configured to enable MACsec network security protocols within an end-to-end network environment for continuing MACsec across NNI nodes and links. Also, the path protection program 106 may be configured to perform path protection functionality for enabling the switching (e.g., switchover) from one path to another, particularly if a first path becomes unavailable as a result of a detected fault or other issues. Also, switchover may be the result of a newly established path being a better or preferred route in a network. As will be known to one skilled in the art upon gaining an understanding of the implementations described, taught, or inferred in the present disclosure, the MACsec program 104 and path protection program 106 may operate in unison and simultaneously to allow MACsec and path protection in a network, which is not possible in conventional systems.

Simultaneous MACsec and Path Protection Processes

Figure 5:
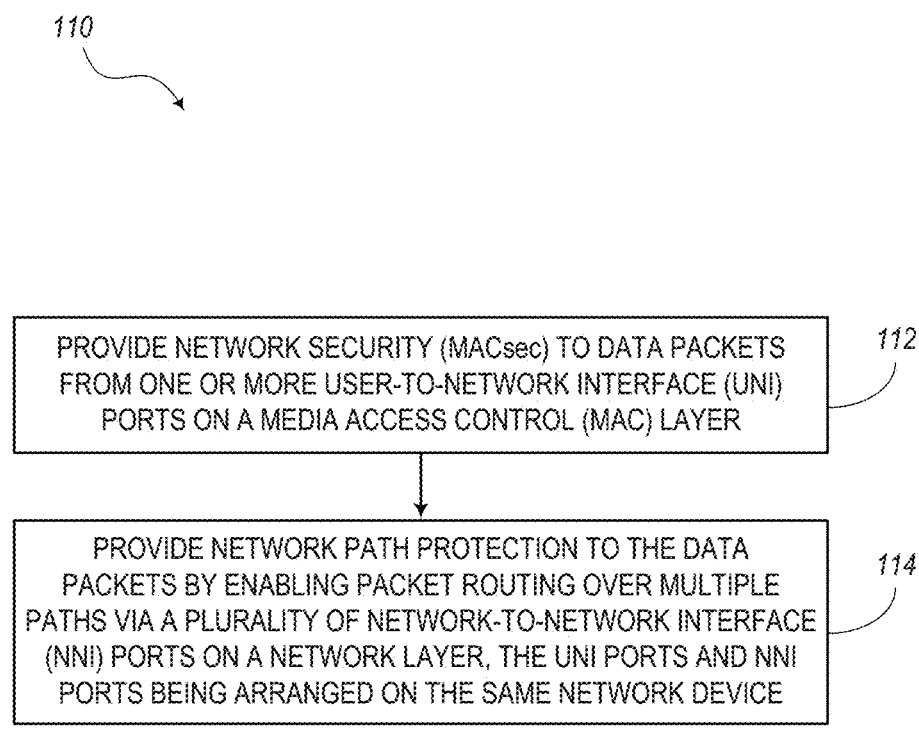
FIG. 5 is a flow diagram illustrating a process for extending MACsec to a network layer to enable MACsec and path protection on a network, according to some embodiments.

FIG. 5 is a flow diagram illustrating an embodiment of a process 110 for extending MACsec to a network layer to enable MACsec and path protection on a network. In this embodiment, the process 110 may be executed as a result of the functionality of the MACsec program 104 and path protection program 106 shown in FIG. 4. The process 110 may include a first step of providing network security to data packets from one or more User-to-Network Interface (UNI) ports on a Media Access Control (MAC) layer, as indicated in block 112. The network security, for example, may defined by the MAC Security (MACsec) protocol. Also, the process 110 may include another step of providing network path protection to the data packets by enabling packet routing over multiple paths via a plurality of Network-to-Network Interface (NNI) ports on a network layer, as indicated in block 112. The UNI ports and NNI ports, for example, may be arranged on the same network device (e.g., Node A shown in FIGS. 2 and 3). In some embodiments, the process 110 may be executed in order to extend MACsec into Layer 3 operation.

Furthermore, the process 110 may include a step of matching a packet number egressing each NNI port with a highest packet number egressing the plurality of NNI ports. With this step of matching PNs, the network may be configured to reduce packet drops when a replay attack process detects differences in packet numbers over the multiple paths. The process 110 may also include utilizing a MACsec Key Agreement (MKA) protocol data unit identified by one or more of a unicast MAC address and a multicast MAC address. The process 110 may also include utilizing a MACsec frame including an EtherType field that records the packet number of each NNI port to identify a protocol of an associated data packet and for Virtual Local Area Network (VLAN) tagging.

The NNI ports may be configured for operation in an Ethernet Ring Protection Switching (ERPS) network defined by G.8032, and wherein a MAC flush action according to G.8032 may be configured to trigger the action of matching the packet number with the highest packet number by reading the packet numbers egressing each NNI port and configuring a receiving edge device in the ERPS with the highest packet number. The NNI ports may alternatively be configured for operation in a packet-switching network selected from the group consisting of a Multi-Protocol Label Switching (MPLS) network, a Segment Routing (SR) network, and a Spanning Tree Protocol (STP) network. The process 110 may further include matching the packet numbers for a primary path and one or more protection paths by synchronizing the packet number of a selected protection path of the one or more protection paths at switchover to the primary path.

According to the embodiments of the systems and methods described herein, the MACsec traffic may be protected at the point of encryption by an edge device enabled for communication over one or more redundant paths to provide path protection for the network traffic with minimal packet drops during path failure or network convergence. In some embodiments, the systems and methods may be interoperable with other MACsec devices provided by different vendors.

Also, the various embodiments enable the packet numbers between working and protecting devices to be synced or matched. The syncing techniques may depend on the network technology being used. For example, in the case of a G.8032 arrangement, it is possible to use the MAC "flush" function arrangement as a trigger to sync the packet numbers. At flush time, the source and destination edge devices may configure their respective NNI ports by reading the PNs and then resetting or reprogramming the PN of the NNI port with a lesser value with that of the greater value.

In the case of an SR network, an MPLS network, or the like, where there is an awareness of a protection switch action, syncing can occur at the time of switchover. In this case, the configuration and PN can be written to the respective NNI ports of the protection path if the PN is lower than working (primary) path PN.

Alternatively, a periodic sync strategy may be used if a) the packet numbers cannot be retrieved at the time of network convergence or path failure. For example, failure may be caused by a line card or other hardware failure. This strategy may also be used if b) protection function may be performed in the hardware with no upward notification capabilities (e.g., hardware-based switchover). In this method, Tx packet numbers PNs on the egress NNI ports may be overwritten with the larger PN. The frequency of the sync process may impact the number of packet drops triggered by replay window protection. These processes may work with different network technologies, such as G.8032, SR, MPLS, or other suitable technologies. Also, the processes may work with existing MACsec devices and networks since no new devices or MKA changes would be needed.

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. An edge device comprising:
one or more User-to-Network Interface (UNI) ports;
a plurality of Network-to-Network Interface (NNI) ports;
a processing device; and
a memory device configured to store a computer program having instructions that, when executed, allow the processing device to:
provide an end-to-end network security on a Media Access Control (MAC) layer, the end-to-end network security defined by the MAC Security (MACsec) protocol, and
provide network path protection by enabling packet routing over multiple paths via the plurality of NNI ports on a network layer by enabling continuity of the MACsec across the plurality of NNI ports from the one or more UNI ports.

2. The edge device of claim 1, wherein the instructions further allow the processing device to extend MACsec operation.

3. The edge device of claim 1, wherein the instructions further allow the processing device to match a packet number egressing of each NNI port with a highest packet number egressing the plurality of NNI ports.

4. The edge device of claim 3, wherein matching the packet number with the highest packet number is configured to reduce packet drops when a replay attack process detects differences in packet numbers over the multiple paths.

5. The edge device of claim 3, wherein the instructions further allow the processing device to utilize a MACsec Key Agreement (MKA) protocol data unit identified by one or more of a unicast MAC address, broadcast MAC address, and a multicast MAC address.

6. The edge device of claim 3, wherein the plurality of NNI ports are further configured for operation in an Ethernet Ring Protection Switching (ERPS) network defined by G.8032, and wherein a MAC flush action according to G.8032 is configured to trigger the action of matching the packet number with the highest packet number by reading packet numbers egressing of each NNI port and configuring an egress NNI port in the ERPS with the highest packet number.

7. The edge device of claim 3, wherein the plurality of NNI ports are further configured for operation in a packet-switching network selected from the group consisting of a Multi-Protocol Label Switching (MPLS) network, a Segment Routing (SR) network, and a Spanning Tree Protocol (STP) network, and wherein the instructions further allow the processing device to match packet numbers for a primary path and one or more protection paths by synchronizing a packet number of a selected protection path of the one or more protection paths at switchover to a primary path.

8. A non-transitory computer-readable medium configured to store computer logic having instructions that, when executed, cause one or more processing devices to:
provide an end-to-end network security to data packets from one or more User-to-Network Interface (UNI) ports on a Media Access Control (MAC) layer, the end-to-end network security defined by the MAC Security (MACsec) protocol; and
provide network path protection to the data packets by enabling packet routing over multiple paths via a plurality of Network-to-Network Interface (NNI) ports on a network layer continuing the MACsec across the plurality of NNI ports from the one or more UNI ports;
wherein the one or more UNI ports and the plurality of NNI ports are arranged on a same network device.

9. The non-transitory computer-readable medium of claim 8, wherein the instructions further cause the one or more processing devices to extend MACsec into Layer 3 operation.

10. The non-transitory computer-readable medium of claim 8, wherein the instructions further cause the one or more processing devices to match a packet number egressing of each NNI port with a highest packet number egressing the plurality of NNI ports.

11. The non-transitory computer-readable medium of claim 10, wherein matching the packet number with the highest packet number is configured to reduce packet drops when a replay attack process detects differences in packet numbers over the multiple paths.

12. The non-transitory computer-readable medium of claim 10, wherein the instructions further cause the one or more processing devices to utilize a MACsec Key Agreement (MKA) protocol data unit identified by one or more of a unicast MAC address and a multicast MAC address.

13. The non-transitory computer-readable medium of claim 10, wherein the NNI ports are further configured for operation in an Ethernet Ring Protection Switching (ERPS) network defined by G.8032, and wherein a MAC flush action according to G.8032 is configured to trigger the action of matching the packet number with the highest packet number by reading packet numbers egressing of each NNI port and configuring a new active port's packet number with the highest packet number.

14. The non-transitory computer-readable medium of claim 10, wherein the plurality of NNI ports are further configured for operation in a packet-switching network selected from the group consisting of a Multi-Protocol Label Switching (MPLS) network, a G.8032 network, a Segment Routing (SR) network, and a Spanning Tree Protocol (STP) network, and wherein the instructions further allow the one or more processing devices to match packet numbers for a primary path and one or more protection paths by synchronizing the packet number of a selected protection path of the one or more protection paths at switchover to the primary.

15. A method comprising the steps of:
providing an end-to-end network security to data packets from one or more User-to-Network Interface (UNI) ports on a Media Access Control (MAC) layer, the network security defined by the MAC Security (MACsec) protocol; and
providing network path protection to the data packets by enabling packet routing over multiple paths via a plurality of Network-to-Network Interface (NNI) ports on a network layer by continuing the MACsec across the plurality of NNI ports from the one or more UNI ports;
wherein the one or more UNI ports and the plurality of NNI ports are arranged on a same device.

16. The method of claim 15, further comprising the steps of, allowing the device to extend MACsec into Layer 3 operation.

17. The method of claim 15, further comprising the steps of, allowing the device to match a packet number egressing of each NNI port with a highest packet number egressing the plurality of NNI ports.

18. The method of claim 17, wherein matching the packet number with the highest packet number is configured to reduce packet drops when a replay attack process detects differences in packet numbers over the multiple paths.

19. The method of claim 17, further comprising utilizing a MACsec Key Agreement (MKA) protocol data unit identified by one or more of a unicast MAC address and a multicast MAC address.

20. The method of claim 17, wherein the plurality of NNI ports are further configured for operation in an Ethernet Ring Protection Switching (ERPS) network defined by G.8032, and wherein a MAC flush action according to G.8032 is configured to trigger the action of matching the packet number with the highest packet number by reading the packet numbers egressing of each NNI port and configuring a new active port's packet number with the highest packet number.

* * * * *